US007255267B2

(12) United States Patent
Chao (10) Patent No.: US 7,255,267 B2
(45) Date of Patent: Aug. 14, 2007

(54) METHOD AND SYSTEM FOR MULTIPLE INCOME-GENERATING BUSINESS CARD AND REFERRAL NETWORK

(76) Inventor: Li-Hsiang Chao, 522 Cardiff, Irvine, CA (US) 92606

( * ) Notice: Subject to any disclaimer, the term of this patent is extended or adjusted under 35 U.S.C. 154(b) by 0 days.

(21) Appl. No.: 11/229,600

(22) Filed: Sep. 20, 2005

(65) Prior Publication Data

US 2005/0279830 A1 Dec. 22, 2005

Related U.S. Application Data

(60) Provisional application No. 60/702,531, filed on Jul. 25, 2005.

(51) Int. Cl.
- *G06Q 30/00* (2006.01)
- *G06Q 40/00* (2006.01)
- *G07G 1/14* (2006.01)
- *G07D 11/00* (2006.01)
- *G07F 19/00* (2006.01)
- *G06K 5/00* (2006.01)

(52) U.S. Cl. .................. 235/380; 235/379; 705/14; 705/38; 705/39

(58) Field of Classification Search ............ 235/380, 235/375, 487, 486, 493, 492, 382, 449, 381, 235/379; 705/14, 10, 21, 30, 34, 35, 38, 705/39, 40

See application file for complete search history.

(56) References Cited

U.S. PATENT DOCUMENTS 5,953,710 A * 9/1999 Fleming ................... 705/38
6,128,599 A * 10/2000 Walker et al. ............. 235/380
6,144,948 A * 11/2000 Walker et al. .............. 705/38
6,222,914 B1 * 4/2001 McMullin ............... 379/144.01
7,103,573 B2 * 9/2006 Mobed et al. ............... 705/56

(Continued)

*Primary Examiner*—Michael G. Lee
*Assistant Examiner*—Thien T. Mai
(74) *Attorney, Agent, or Firm*—East IP Group; Philip K Yu (57) ABSTRACT

A system and method for using a communications network with a server and a database to provide income-generating business card and referral card network. In one embodiment, a credit card issuer provides a set of personalized business cards to a first customer for his use, upon qualifying the first customer for a credit card from the card issuer. The business cards can be used to receive a discount from a merchant within certain network affiliated with the card issuer. At the same time, the business cards provide a linkage to the first customer's account, so that the first customer will receive a credit to his account, based on the second customer's use of the business card at an affiliated merchant. The second customer is then invited to apply for a credit card from the card issuer. If the second customer qualifies and accepts the credit card, the second customer receives his own set of personalized business cards for distribution. Whenever the second customer uses his credit card anywhere, another credit is applied to the first customer. Also, whenever a third customer uses the second customer's business card during a commercial transaction, the second customer will receive a credit in his account. If the third customer also becomes a credit card holder from the card issuer, the second customer will then receive a credit whenever the third customer uses his credit card anywhere. The system may be set up so that the customers who refer continue to receive credits whenever customers from one or more levels below use the business cards for discounts, or use their own credit cards.

10 Claims, 5 Drawing Sheets

U.S. PATENT DOCUMENTS

| | | | |
|---|---|---|---|
| 2002/0167160 A1* | 11/2002 | Lamson | 283/70 |
| 2003/0126015 A1* | 7/2003 | Chan et al. | 705/14 |
| 2003/0236704 A1* | 12/2003 | Antonucci | 705/14 |
| 2004/0230484 A1* | 11/2004 | Greenlee | 705/14 |
| 2004/0236681 A1* | 11/2004 | Modigliani et al. | 705/39 |
| 2004/0254833 A1* | 12/2004 | Algiene | 705/14 |
| 2006/0155603 A1* | 7/2006 | Abendroth et al. | 705/14 |
| 2006/0190325 A1* | 8/2006 | Tarsh | 705/14 |
| 2006/0271391 A1* | 11/2006 | Lee | 705/1 |
| 2006/0280299 A1* | 12/2006 | Przybilla | 380/44 |

* cited by examiner

METHOD AND SYSTEM FOR MULTIPLE INCOME-GENERATING BUSINESS CARD AND REFERRAL NETWORK

This application claims priority benefit under 35 U.S.C § 119/120 based on application 60/702,531 filed Jul. 25, 2005.

FIELD OF THE INVENTION

The present invention relates to a method and system for generating income and promoting commercial transactions using a database, a network and a staple item such as the business card, referral card or credit card, and more specially relates to a multiple income-generating business card and referral network, for both card holders and card recipients, using the Internet, databases and servers.

ART BACKGROUND

Business cards have long been used by individuals to promote themselves or the product and services they represent. However, once a business card is handed out to a recipient, the card basically does not provide any assurance that the recipient will patronize the card-owner's business, or purchase any products from the card-owner. The use of the card in a way that is beneficial to the card-owner is entirely at the hands of the recipient. Of course, exchanging business cards has become such a common practice nowadays that people just hand them out quite readily no matter what. Even when the recipient gets in touch with the card-owner based on the information on the card, there is still no assurance of any direct and immediate benefit to the card-owner.

Therefore, it is desirable to be able to make the recipient's use of the business card to generate direct and immediate benefit to the card-owner ("first owner").

Additionally, once a direct and immediate benefit is conferred upon the card-owner, it is desirable to be able to benefit the recipient as well.

SUMMARY OF THE INVENTION

A system and method for using a communications network with a server and a database to provide income-generating business card and referral card network is disclosed. In one embodiment, a credit card issuer provides a set of personalized business cards to a first customer for his use, upon qualifying the first customer for a credit card from the card issuer. The business cards can be used to receive a discount from a merchant within certain network affiliated with the card issuer. At the same time, the business cards provides a linkage to the first customer's account, so that the first customer will receive a credit to his account, based on the second customer's use of the business card at an affiliated merchant. The second customer is then invited to apply for a credit card from the card issuer. If the second customer qualifies and accepts the credit card, the second customer receives his own set of personalized business cards for distribution. Whenever the second customer uses his credit card anywhere, another credit is applied to the first customer. Also, whenever a third customer uses the second customer's business card during a commercial transaction, the second customer will receive a credit in his account. If the third customer also becomes a credit card holder from the card issuer, the second customer will then receive a credit whenever the third customer uses his credit card anywhere. The system may be set up so that the customers who refer continue to receive credits whenever customers from one or more levels below use the business cards for discounts, or use their own credit cards. As a way to provide more motivation and rewards, the system may also be set up so that the customers who refer continue to receive new business cards whenever one of his business cards results in a credit card being issued to those who are referred by his business cards.

In another embodiment, the system provides a set of referral cards to the card holder, where the referral cards give a discount to whoever presents the referral card during shopping, and provide a link to the card holder's account for issuing credits. The card holder's account will receive a credit, whenever one of the referral cards is used by another customer during a transaction, whenever one of the referred customers applies and receives a credit card, or whenever one of the referred customers uses the credit card.

In yet another embodiment, the system provides a set of business or referral cards to a first member within a merchant network. If the first member gives the card to a second person, who comes to shop within the merchant network while referring to the card received from the first member, the second person will receive a discount, while the first member receives a credit to his account. If the second person accepts the invitation and becomes a member of the merchant network ("second member"), then the first member will receive a credit whenever the second member shops within the merchant network, regardless of the second member's method of payment. The second member is also issued a set of his own business or referral cards for his own distribution. If a third person uses the second member's business or referral card, then the third person is entitled to receive a discount, while the second member (and even first member) receives a credit to his account. If the third person becomes a member ("third member"), then the second member (and even first member) will receive a credit whenever the third member shops within the merchant network, regardless of his method of payment. As a way to provide more motivation and rewards, the system may also be set up so that the customers who refer continue to receive new business or referral cards whenever one of his cards results in new membership from those who are referred by his referral cards.

BRIEF DESCRIPTION OF THE INVENTION

DETAILED DESCRIPTION OF THE INVENTION

A system and method for using a communications network coupling a server and a database to provide a multi-layer income-generating business card and referral network (hereinafter "BCN") for cardholders, card issuers and merchants is disclosed. Any applicant may become part of the BCN by applying for a credit card or debit card at a card issuer, a bank, e.g. Chase Manhattan®, or an agent or affiliate of the card issuer, e.g. Starbucks® or KFC®, followed by actual consumption using the issued credit card. It should be noted that the "business card" may be in physical form, such as the conventional business card, or in electronic/virtual form, such as one distributed through electronic means or through the Internet. In the traditional mode, one gives a physical business card to his recipient. In the electronic world, one gives an electronic message to his recipient, typically through an electronic email. Also, for those carrying personal digital assistants ("PDA") or smart phones, people exchange "business cards" by beaming each other's data using infrared ("IR") links. Further, the "business card" may take the form of a simple referral coupon, which allows the system to trace back to the source of the coupon during transaction. The referral coupon may simply indicate the BCN network and the account number for the referral source. All of the above forms of business cards, or referral coupons, are collectively referred to simply as "business cards" for the ease of description hereinafter.

Upon approval, the applicant is now qualified for joining the BCN, and the applicant is issued a credit card or debit card. The card issuer can now have an account set up by its server 220 (FIG. 2) on its database 224 (FIG. 2) for the applicant in the BCN. For the simplicity of description, the credit card or debit card will be referred to simply as a "credit card" in the following description. By using the credit card in a commercial transaction, say, within 10 days, the cardholder is now officially in the BCN, which entitles the cardholder to receive direct and immediate benefits on the cardholder's account, as will be described below. Of course, the system may be set up so that the applicant is automatically enrolled, without having to first use the card within certain days. However, having the applicant use the card is beneficial in promoting more credit card transactions.

Also, it should be noted that the "credit card" may be in electronic format, e.g. virtual cash stored on the cardholder's mobile phone. The credit card may also be in biometric format, where authentication for transaction is based on recognition of the cardholder's retina, fingerprint or other biometric data. In other words, as long as there is a way to authenticate the cardholder (electronically or biometrically), a "credit" transaction may take place, where the merchant is guaranteed payment based on authentication of the customer. Therefore, the use of the term "credit card" or "debit card" is not intended to be limiting or restrictive, but merely illustrative of one aspect of the present invention.

Figure 2:
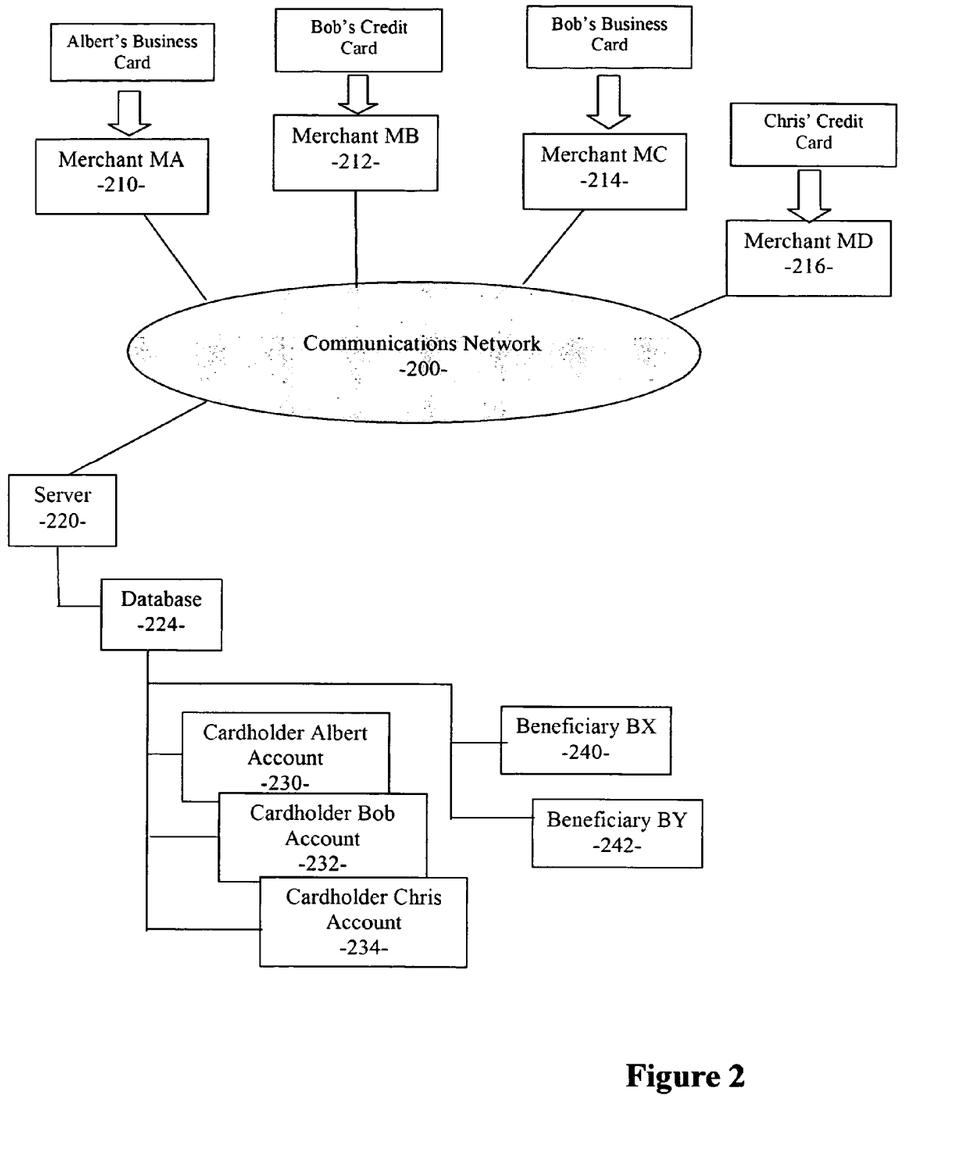
FIG. 2 illustrates an exemplary system diagram in accordance with the present invention.

Reference is to FIG. 2. The server 220 and database 224 are of course connected to a communications network 200, e.g. the Internet or a virtual private network, such that the card issuer, its agents or affiliated merchants may sign up applicants anywhere through the communications network 200.

Figure 1:
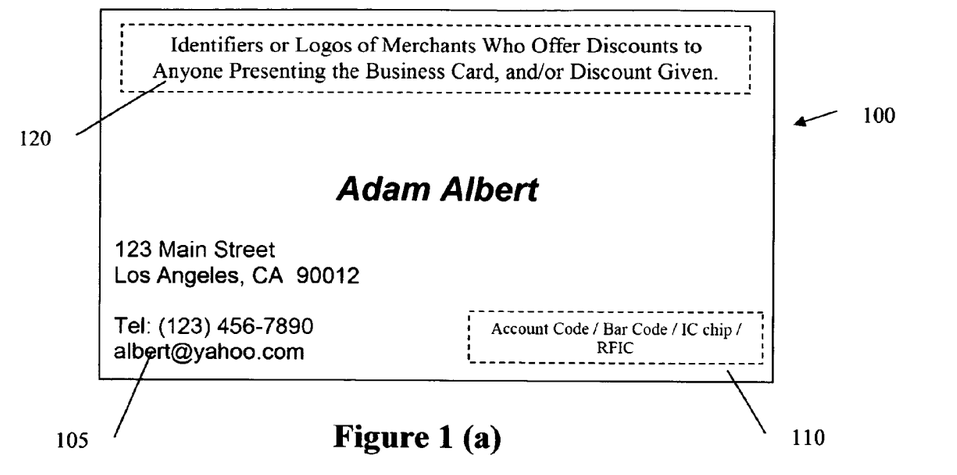
FIG. 1(a) illustrates one exemplary embodiment of the business card for use with the present invention.
FIG. 1(b) illustrates another exemplary embodiment of the business card for use with the present invention.

In addition to the credit card, the "cardholder" is issued a starter set of personalized business cards, where each of the business cards contains information about the cardholder's account, and information about discounts given by certain merchants who participate in the network. For example, as shown in FIG. 1(*a*), the business card 100 displays the cardholder's contact information 105, just like a typical business card for either personal or business use. Additionally, the business card 100 displays, or provides linking to, the cardholder's account number in alphanumeric digits, in bar code format, or other machine/human readable format 110. Of course, the cardholder's account information may even be embedded in a passive or active integrated circuit chip 110, provided it is cost-effective. Finally, the business card 100 displays the identifiers or logos 120, or even the discount policy, of those merchants who will issue, say, a one-time discount to whoever presents this business card 100 at a point of sale. The logos 120 can serve as a quick reminder for the cardholder when he or she decides where to conduct business or shop.

It should be noted that the cardholder may, instead, be issued a set of bar code stickers for attachment to his or her existing business cards. Also, instead of having the merchant identifiers or logos displayed on the business card 100, those merchants who participate in the BCN can simply display a logo representative of its affiliation with the BCN at the store front, or on their web sites if they are on-line businesses. FIG. 1(*b*) illustrated another embodiment of the present invention, where the business card 100 is now printed showing with the business card network, or BCN 122, allowing the business holder to readily identify any participating merchants. This alternate approach will ensure that the logos are not constrained by the size of the business card 100, since the BCN 122 may easily encompass more merchants than there is room for on the business card 100. Also, since from time to time new merchants may join the BCN, and old merchants may depart the BCN, having the merchants display their affiliation at their sites will make it easier for customer recognition.

Also, instead of physical business cards, the cardholder may be issued electronic business cards, or electronic referral coupons, which can link to the cardholder and allow the cardholder to electronically distribute his business card. Instead of physically distributing his business cards, the cardholder simply distributes his electronic business cards, or electronic coupons, to his associates through e-mail, or by exchanging the IR beam of their PDAs. Upon receiving the electronic cards, the recipients can use them to get the discounts, via on-line shopping or traditional shopping, by presenting the code on the electronic card. Therefore, the invention is not limited to business cards in the physical format. Rather, it can be extended to any means, such as electronic, wireless, virtual or physical, where the cardholder's information is distributed to a recipient. In fact, the cardholder may even be issued his "business card" by receiving text messages or short-messages ("SM") on his cell phone. By physically or electronically distributing the SM to his recipients, the SM can be used as code to link the purchase to the cardholder's account.

Cardholder's First Line of Direct and Immediate Benefit

Reference is now turned to FIG. 2, where a simplified diagram illustrating one aspect of the present invention is disclosed. After cardholder Albert receives the credit card and the business cards (or the bar code stickers as previously described), he may distribute his business cards to anyone, as in the case of his typical business cards. When a customer Bob presents cardholder Albert's business card to a merchant MA 210 during a purchase, Bob will receive a one-time discount, e.g. 10% off, for his purchase. Also, the merchant MA 210 will notify the card issuer's server 220 so that cardholder Albert account 230 will receive a one-time credit, e.g. 0.5%, based on Bob's consumption. Cardholder Albert may thus receive a first direct and immediate benefit on his account whenever one of his business cards is presented by one of his recipients to a merchant in the BCN. Since each card entitles cardholder Albert to receive one credit, after all the business cards are presented for discount by his recipients, cardholder Albert's first line of benefit may reach its end, but it does not have to end this way. The system may, alternately, be set up so that Albert continues to receive new business cards when all the business cards have been presented for discount. By "credit," it is meant a benefit conferred upon Albert's account in any commercially feasible format, e.g. discount, credit, offset, or rebate. The use of the term "credit" is not to be interpreted in any way as limiting or restrictive. It is only an exemplary usage. It should be noted that the implementation of the first line of direct and immediate benefit may depend on the specific system design. In some implementation, there is no first line of benefit, for simplicity's sake. In other situation, the first line of benefit may be a fixed value, e.g. $2, credit to Albert's account.

It should be noted that the overall system may be implemented such that Albert only receives a first line of benefit upon Bob's application for a credit card, instead of Bob's consumption using the business card. Such features are entirely up to the system planners or architects, and may depend on business reasons.

It should further be noted that when Bob presents Albert's business card to a merchant, a discount may be applied to a single product, a variety of products or everything carried by the merchant. Such feature may be designed based on the overall business objectives.

Cardholder's Second Line of Direct and Immediate Benefit

When customer Bob presents cardholder Albert's business card to merchant MA 210 for the one-time discount, customer Bob is invited by merchant MA 210 to apply for a credit card. The system, of course, may be designed so that Bob is not required to use Albert's business card in order for Albert to receive a credit. For example, Albert may receive a credit only when Bob applies for a credit card. If customer Bob applies and qualifies for a credit card, customer Bob will receive his own credit card, along with his own starter set of personalized business cards (or the bar code stickers as previously described). If cardholder Bob uses the credit card within certain time frame, cardholder Bob is now officially in the BCN. When cardholder Bob becomes an official member of the BCN, an account 232 is established for cardholder Bob. Since cardholder Bob is referred by cardholder Albert, cardholder Albert's account is updated so that whenever cardholder Bob uses his credit card in a commercial transaction, say at merchant MB 212, cardholder Albert account 230 will receive another credit, which is the second line of direct and immediate benefit. This second line of benefit occurs whenever Bob uses his credit card, unlike the first line of benefit, which may end when all the business cards are presented by the recipients.

It should be pointed that a credit card may be "used" by a user such as Bob in at least the following exemplary ways: (1) to purchase good or services with full balance paid off at each billing period, (2) to purchase goods or services with partial payment and pay off the balance over time, or (3) to borrow money against the credit card as in the case of "cash advance" and pay off the balance overtime. The card issuer of course charges the most interest, or financing fees, for "cash advance" borrowings. As such, if Bob uses the credit card for cash advance, the card issuer can make more profit from the balance Bob carries. Therefore, by using the "credit card," it may even be extended to getting a loan from the card issuer, and should not be limited to just a simple credit card transaction. If the card issuer makes more profit on the interest, it may be more motivated to give more credit/rebate to Bob's upstream, Albert.

Also, cardholder Albert may receive another set of his own personal business cards, due to cardholder Bob's joining of the BCN. This second set of business cards can be distributed by cardholder Albert so as to extend his first line of direct and immediate benefit, in the same fashion as his starter set of business cards. Of course, the new free cards may be provided based on Albert's spending, on the number of Albert's referred customers, on the overall spending of Albert's referred customers or various other schemes.

It should be noted that Bob's membership into the BCN may be triggered by Bob's application for a credit card, or by Bob's application for a credit card plus consumption. Many possible ways of activating Bob's membership may be devised based on the teaching of the present invention.

Cardholder's Third Line of Direct and Immediate Benefit

Cardholder Bob now distributes his own set of business cards, one of which is received by customer Chris. Customer Chris now presents cardholder Bob's business card to merchant MC 214 and receives a discount on his purchase. In the same manner as previously described, cardholder Bob will receive a one-time credit in his account 232 whenever one of his business cards is presented during a purchase. This will begin cardholder Bob's first line of direct and immediate benefit, until the business cards from the starter set are all presented.

When customer Chris presents cardholder Bob's business card to merchant MC 214 for the one-time discount, customer Chris is also invited by merchant MC 214 to apply for a credit card. If customer Chris applies and qualifies for a credit card, customer Chris will receive his own credit card, along with his own starter set of personalized business cards (or the bar code stickers as previously described). If cardholder Chris uses the credit card within certain time frame, cardholder Chris is now officially in the BCN. When cardholder Chris becomes an official member of the BCN, an account 234 is established for cardholder Chris. Since cardholder Chris is referred by cardholder Bob and indirectly by cardholder Albert, cardholder Albert account 230 and cardholder Bob account 232 are both updated so that whenever cardholder Chris uses his credit card in a commercial transaction, say at merchant MD 216, both cardholder Albert account 230 and cardholder Bob account 232 will receive another credit or rebate. This credit now becomes the third line of direct and immediate benefit for cardholder Albert, but the second line of direct and immediate benefit for cardholder Bob. This two lines of benefits, i.e. third line for Albert and second line for Bob, occur whenever Chris uses his credit card.

Also, cardholder Bob may receive another set of his own personal business cards, due to cardholder Chris' joining of the BCN. This second set of business cards can be distributed by cardholder Bob so as to extend his first line of direct and immediate benefit, in the same fashion as his starter set of business cards.

As can be appreciated by those skilled in the art, the lines of benefits for cardholder Albert, or any other cardholder, may extend indefinitely, at least theoretically; that is, as long as someone down the line from cardholder is using the credit card, cardholder Albert's account 230 will receive a direct and immediate benefit, without any efforts by Albert, other than the initial distribution of his business cards. Of course, the actual implementation may only allow certain lines of benefits for ease of calculation.

Referring to FIG. 3(*a*), an exemplary flow chart for a simple system in accordance with the present invention is shown. As shown, various arrows represent different benefits that can be conferred up the referring source(s). First, Albert sets up an account (box 30) and is given a starter set of business cards or referral cards. When Bob uses one of Albert's cards (box 31), Bob may receive a discount. More importantly, Albert may receive a benefit (Line A1) based on Bob's use of the business or referral card.

If Bob also sets up an account for a credit card or membership card (box 32), Albert may also receive a benefit (Line A2). Also, whenever Bob conducts a transaction using the credit card or through the membership (Box 42), Albert may again receive a benefit (Line A3).

Bob also passes out his business card to Chris, who uses the card for a transaction (box 33). Now, Bob may receive a benefit (Line B1), while Albert may also receive a benefit (Line A11). Of course, the system may be designed so that benefits from the use of business or referral cards do not go beyond one upstream generation.

If Chris also sets up an account for a credit card or membership card (box 34), Albert may receive another benefit (Line A21). Bob, as the immediate referral source, may receive a benefit (Line B2). If Chris uses his credit card or membership card (box 44), Bob may receive a benefit (Line B3), and Albert may receive a benefit (Line A31).

Now, if David uses the business card or referral card from Chris (box 35), the system may set up so that Chris receives a benefit (Line C1), Bob receives a benefit (B21) and Albert receives a benefit (A22).

As can be appreciated by those skilled in the art, the architecture of the system is quite scalable or flexible, in that the benefits can be combined or extended as the design requires. While FIG. 3(*a*) shows a "straight-line" generation from Albert through Bob to Chris, it should be understood that each may, and most likely will, have multiple downstream parties who uses the business card and/or use the credit cards. The flexibility of the system in accordance with the present invention makes it more powerful and rewarding to those who participate in it.

Figure 3:
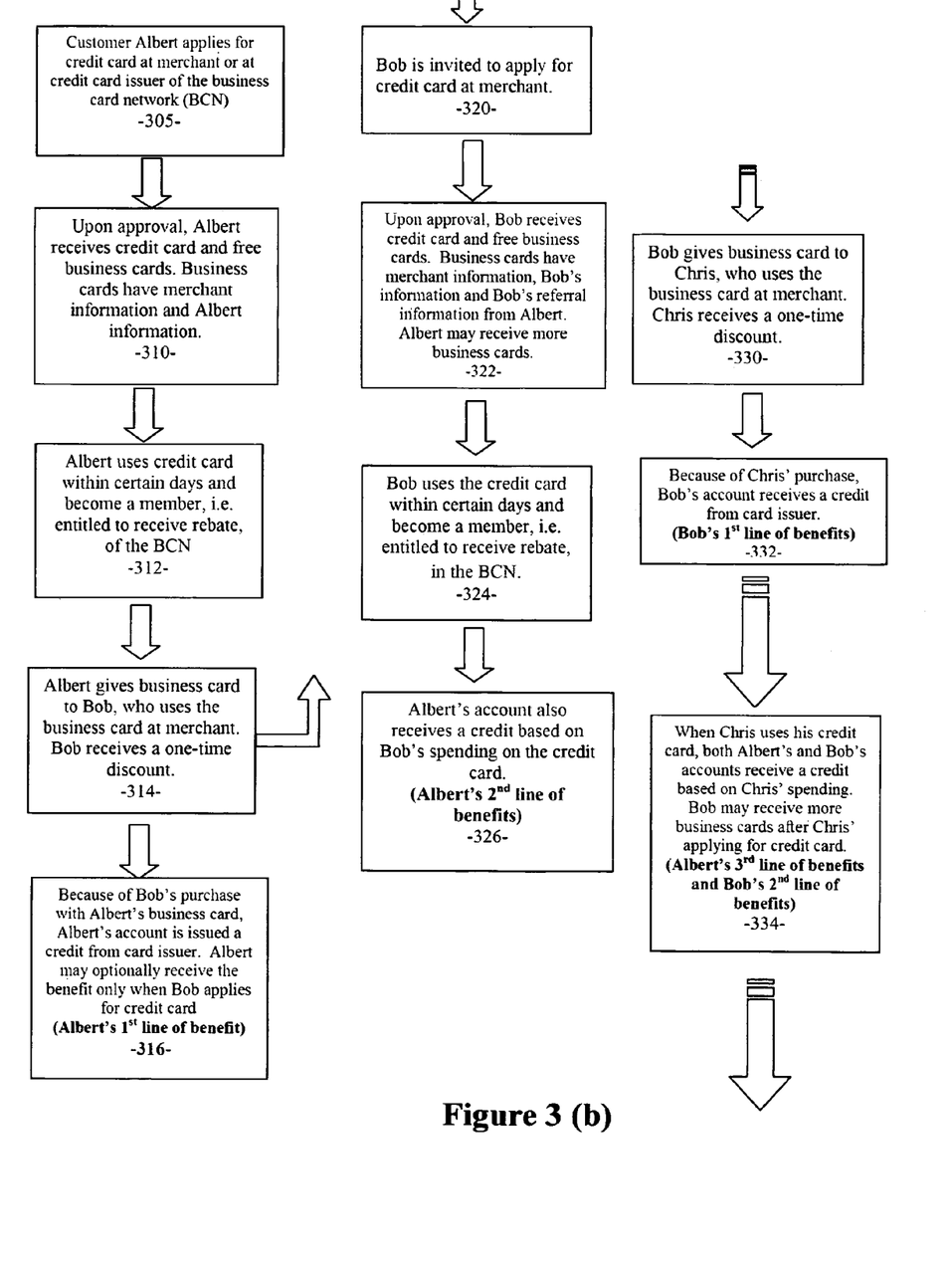
FIG. 3(a) illustrates a simple exemplary process flow in accordance with the present invention.
FIG. 3(b) illustrates another exemplary process flow in accordance with the present invention.
Figure 3A:
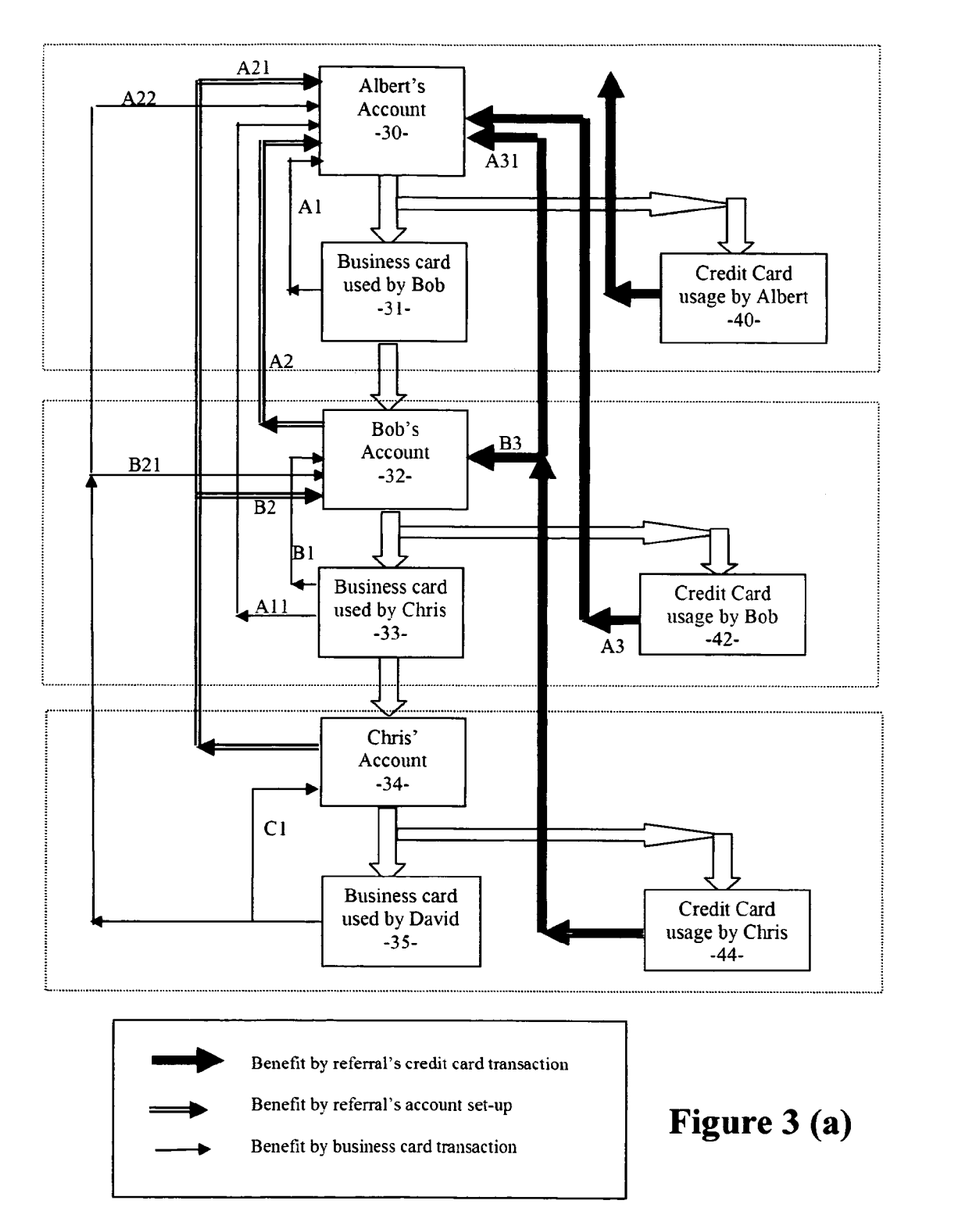

Referring to FIG. 3(*b*), an exemplary flow chart of the present invention is shown. It should be pointed that the flow chart merely represents one embodiment of the multiple income-generating business card system in accordance with the present invention.

Box 305.

First, customer Albert applies for a credit card at a merchant or a card issuer of the business card network ("BCN"). As previously mentioned, by "credit card," it could be a credit card, a debit card, membership card, or any kind of arrangement where the customer is allowed to use the card in a commercial transaction for some special privilege based on the customer's affiliation with the BCN or membership in the BCN. Also, the credit card and its account allow Albert to receive benefits issued by the card issuer. For example, the card may be a membership card for shopping at Costco®, where Albert will receive a certain benefit based on Bob's subsequent purchase at Costco, if Bob's joining Costco is referred by Albert. In this situation, the "credit card" is a special membership card. Therefore, the use of the term "credit card" is by no means limited to only to those commonly known as credit cards or debit cards.

As can be appreciated, a membership card may have much wider application than the credit card, since Bob is not limited to how he pays for the transaction, as long as Bob shops at the membership store. Bob is not required to only use the network's credit card, in order receive discounts. Likewise, Albert's benefits do not depend on Bob's use of any particular credit card or debit card.

Box 310.

Upon approval, Albert is issued a starter set of personalized business cards. On the business cards, merchant information and Albert's account information are displayed. Merchant information may simply be the BCN-affiliated merchants' logo, or the logo for the BCN. Albert's information may be a bar code or simply an account number for machine recognition or human recognition. As previously described, the "business cards" may simply be an electronic coupon, which allows Albert to email them to his associates. Upon receiving the email, his associates may present the electronic coupon, either in on-line shopping or traditional shopping. Also, the coupon code may be transmitted to Albert via text messages, which can be distributed electronically or physically to Albert's associates.

Box 312.

If Albert uses the newly issued credit card, Albert becomes a member of the BCN and entitled receive credits based on certain conditions (to be described). It should be pointed out that membership in the BCN may not depend on Albert's initial usage of the issued credit card. Other triggering events may also be applicable.

Box 314.

After Albert gives one of his starter business cards to a friend or business associate, e.g. Bob, Bob can present Albert's business card to a BCN-affiliated merchant to receive a, say, one-time, discount. Upon usage, the business card is returned to Bob. The merchant may mark off directly on the business card that its one-time discount has been applied, or simply enter the information to the BCN network. It should be noted that the business card discount scheme may be set up so that it provides discounts to Bob during one or multiple transactions, or within certain time period during which the business card must be used.

Box 316.

Because of Bob's purchase, Albert is now entitled to receive a credit based on Bob's purchase price. The credit is directly applied to Albert's account with the card issuer. This credit represents Albert's first line of direct and immediate benefit, all without requiring Bob to buy certain designated products. All Bob has to do is simply purchase from the affiliated merchant, which is an ever-expanding network. In the aforementioned example of a "membership card" offered through Costco, if Bob continues to shop at Costco, Albert will receive a credit based on Bob's purchase. This kind of benefit, of course, may be design to terminate after certain time period, or max out after certain dollar amount. It should be noted that the implementation may be designed such that there is no first line of benefit simply based on Bob's purchase using Albert's business card. Albert may receive a first line of benefit only upon Bob's applying for the credit card, or applying to join the BCN.

Box 320.

When Bob's purchase is taking place at the merchant, Bob is invited to join the BCN network by applying for a credit card. It should be noted that the invitation may be more enticing when Bob is still physically at the merchant's site. Alternately, Bob may simply be offered an application form for him to fill out at this leisure.

Box 322.

If Bob proceeds to apply and qualifies for a credit card, Bob also receives his own credit card, as well as his starter set of business cards. The business cards will include the same kind of information as Albert's; however, Bob's account will also include a reference to Albert's account, since Albert is the one who refers Bob to the BCN. Additionally, because of Bob's applying for a credit card, another set of business cards may be issued to Albert, thus allowing Albert to generate more rebates.

Box 324.

By using the credit card within certain days, Bob becomes a member of the BCN and entitles to receive benefits, as in the case of Albert. At this point, if the overall system design permits, Albert may be issued a second set of personalized business cards to allow him make more distribution of his own business cards.

Box 326.

Whenever Bob uses his credit card at any merchant, whether it is BCN affiliated or not, Albert's account will receive a rebate on Bob's purchase. Here comes Albert's second line of direct and immediate benefits. Also, Bob is using his credit card the same way as any other credit card, and is not required to shop at any BCN merchants. Of course, it should be noted that some countries, at present, may not allow multi-level income generating schemes. As such, the system may be designed so that the downstream members, i.e. those referred by Bob, do not generate any credit or rebate to Albert. Albert thus only derives benefits based on his own direct downstream members, for example, Bob. Alternately, Albert may receive a one-time referral credit whenever Bob's downstream members apply for and/or accepts the credit card. However, in such one-level income generating network, each member may derive benefits from any number of downstream members, albeit only once per downstream member, which may still be quite an impressive amount overall. Essentially, many different implementations are available, depending on the overall system design based on business and technical considerations.

Box 330.

If Bob gives his business card to Chris, who presents the business card to a merchant affiliated with the BCN, Chris will be entitled to a one-time discount.

Box 332.

Bob will also receive a credit on his account, which is Bob's first line of direct and immediate benefit, as in the case of Albert.

Box 334.

If Chris also takes up on the invitation to apply for and receive a credit card, both Albert's and Bob's accounts will be referenced in Chris' account. Whenever Chris uses his credit card, anywhere, both Albert and Bob will receive a credit in their accounts. Such credit will be Albert's third line of benefits, but the second benefit with Bob. Also, Bob and/or Albert may receive another set of business cards for their use, thus allowing them to generate more rebate. As can be appreciated, having those cards creates recursive actions, thus motivating the cardholders to distribute them. Of course, the actual implementation is entirely dependent on business reasons, as well as possible technical reasons.

It should be pointed out that the present invention is not limited to conferring benefits to the referral chains. Other entities, such as charity, school or other entities, may also be designated as a beneficiary by the BCN or by the cardholders themselves. For example, Albert may indicate in his account profile that a percentage of his received credits will go to the Tsunami Relief, or Tzu-Chi World Benevolent Association. Upon such indication, whenever Albert's account is eligible for a credit, e.g. due to Bob's purchase or Chris' purchase, a portion of Albert's credit will go to his designated beneficiary. All this giving and benefiting will occur without requiring any one to purchase anything not in the normal course of behavior. No one is required to buy from certain place or certain vendor!

Although not depicted in the drawings, the benefits given to a cardholder's upstream referral could be extended to multiple generations above. The extent of referral benefits is decided by how the reward system is to be carried out as well as how complicated the computation methodology is designed.

Direct and Immediate Benefits to Charity

The above described lines of direct and immediate benefits are not limited to only benefit cardholders. The benefits may even be directed to certain charity beneficiary BX 240, provided that the beneficiary account is first set up, say, by the card issuer. Alternately, a charitable organization may be an agent for a card issuer so that a customer applies for a credit card through the charitable organization. In either way, the charitable organization may become a beneficiary and have a beneficiary account 240 created by the card issuer. If cardholder Albert applies and receives a credit card through the charitable organization, this charitable organization will receive a credit or rebate in the form of charitable contribution whenever cardholder Albert uses his credit card. Moreover, whenever Albert's next line, say, Bob, uses his own credit card, another charitable contribution is made to the charity.

Even if the credit card is not obtained through the charitable organization, cardholder Albert may designate a portion of his credit incomes to be directed to his favorite charitable organization, say, Beneficiary BY 242, by editing his cardholder account 230. Therefore, even cardholder Albert will receive less rebates, he nevertheless knows that he is giving to charity.

Lines of Benefits without Limiting Cardholder's Purchasing Behavior

As previously mentioned, credits and rebates to the referring sources, i.e. upstream, will occur whenever a cardholder's credit card is used. The more transactions are done, the more credits are accumulated and almost in exponential manner. In contrast to many conventional rebate schemes, the system of the present invention does not require the cardholder to alter his or her purchasing behavior. The cardholders are not required to purchase only from certain vendors; all they have to do is to distribute their business cards and use their BCN credit cards. The cardholders can still purchase things as before. The more business cards are distributed and more recipients join the BCN, the more credits are directed toward their accounts. While the first line of benefit terminates after all the business cards have been presented (if the first line of benefit is offered), the second, third and any following lines of benefits theoretically do not terminate. Of course, the actual implementation will depend on business, as well as technical, reasons.

For example, in many networks commonly known as the multi-level direct marketing networks, a member must purchase a minimum amount of goods from the manufacturer in order to sustain his status. Quite often, those goods are sold to members at comparably higher prices than their commodity counterparts, even though their costs may be lower. In accordance with the present invention, members are not required to purchase anything from the manufacturer or any vendor. Members simply have to use the credit card issued by the card issuer in order to derive direct and immediate benefits from the BCN.

No Additional Cost to Consumers and Merchants

The rebates or credits issued to the cardholders may come from a portion, say, 0.5%, of the incentives paid by credit card issuers to merchants for credit card transactions. As such, the cardholders of the BCN are not encumbered by any additional cost in their purchase prices. Similarly, merchants do not have increase the prices in order to participate in the BCN. Although credit card issuers may see a reduction in the transaction fees they collect from the merchants, such reduction is more than made up by the increased usage and cardholders, as the BCN system gains momentum.

Another Exemplary Network

Figure 4:
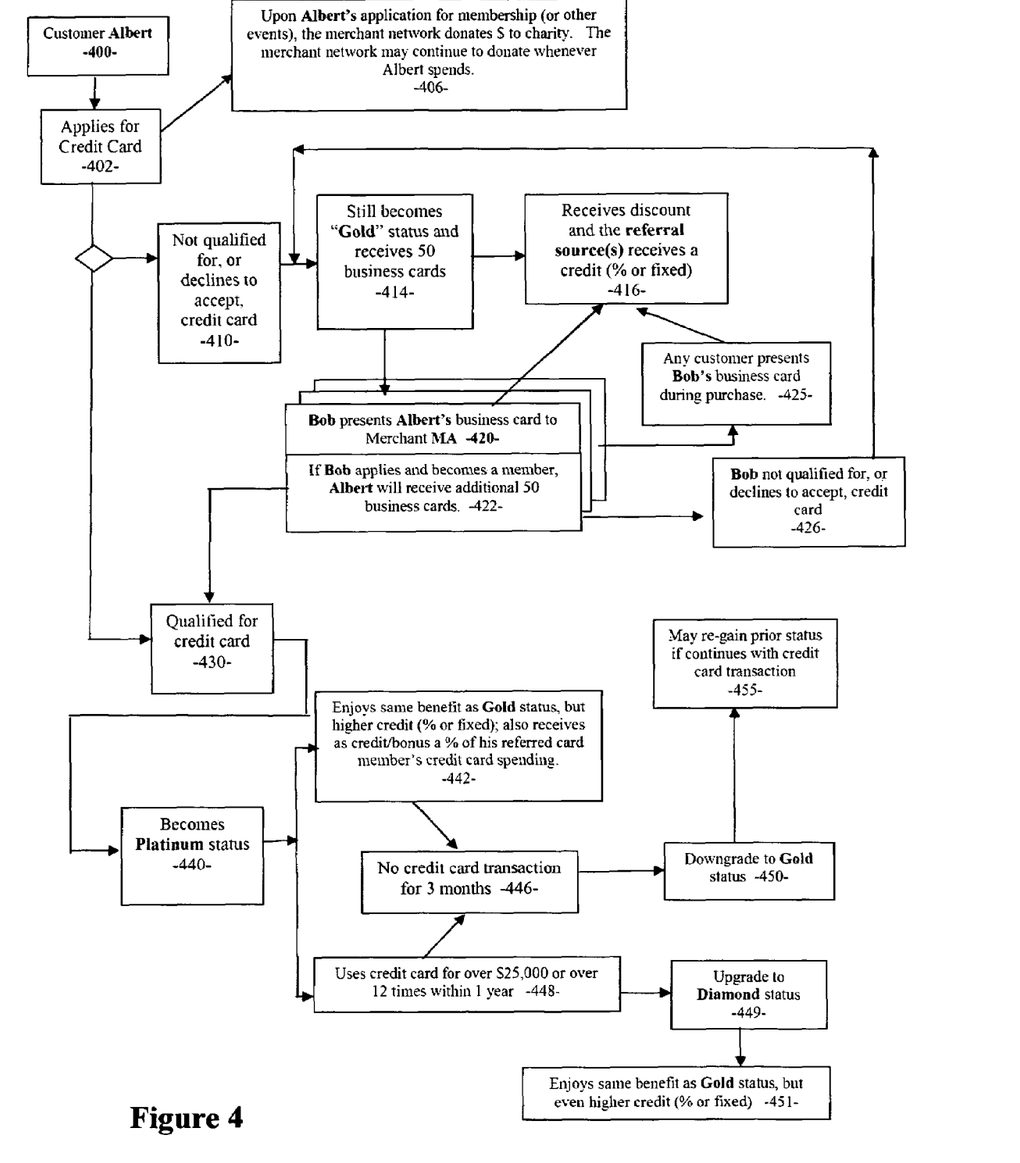
FIG. 4 illustrates another exemplary process flow in accordance with the present invention.

Another exemplary process flow for a business card and referral network is illustrated in FIG. 4. It should be noted that the "credit card" may also mean a membership card (entitling the member to shop within a merchant network) and the "business card" may also mean a referral coupon (physical or electronic) with linkage to its referral source(s).

Boxes 400 and 402

Customer Albert applies for a credit card, or applies to join a membership-based merchant network at Merchant MA.

Box 406

Upon Albert's application and/or qualification, the merchant network (or Merchant MA) makes a donation to a designated charity. It should be noted that the system may be designed so that the charity continues to receive a donation from the merchant network (or the merchant) based on Albert's use of the credit card, whether at Merchant MA or elsewhere.

Boxes 410 and 414

If Albert does not qualify for, or declines to accept, a credit card, Albert may still be Gold status and will receive, say, 50 business cards (or referral coupons with linkage to Albert's account).

Boxes 420, 422, 425, 416 and 426

After Albert gives a business card to Bob, Bob presents the card to Merchant MA. Bob receives a discount on his purchase and Albert receives a credit to his account, which may be a fixed value or a % of based on Bob's purchase. If Bob also applies for a credit card or to join the membership-based merchant network, Albert may receive additional business cards for Albert's use. Of course, the system may be designed such that no more cards are given to Albert. Anyone who presents Bob's business card will receive a discount and Bob (and optionally Albert) as the referral source may receive a credit to his account. On the other hand, Bob may not qualify for, or refuses to accept, a credit card, which still entitles Bob to Gold status as in Box 414.

Boxes 430, 440, 442, 448, 451, 455

If Albert qualifies for, and accepts, a credit card, Albert obtains Platinum status, which entitles Albert to additional benefits to the Gold status, with higher credit. If Albert's use of the credit card reaches certain dollar amount or transactions, Albert may be upgraded to Diamond status, thus entitling Albert to even higher credit. However, if Albert fails to use the credit card within, say, 3 months, Albert may be downgraded to Gold status. Downgrading may also apply if Albert fails to achieve certain transactional dollar amount or threshold number of transactions. Albert may regain his status by continuing the use of his credit card. Additional benefits to Albert may come from receiving a percentage of Albert's referred member's credit card spending.

Another Exemplary BCN

Let us take a bank as the card issuer, who generates revenue based on the transactions of its customers using its credit card, as well as its customers taking a loan from the bank. When Albert applies for and receives a credit card (with a bank account set up) from the bank, Albert can distribute the starter set of business or referral cards to his associates. The business cards may entitle the holders to certain discounts from the bank and the bank's affiliated merchants. If Bob presents the business card to a participating merchant, Bob will receive an immediate discount on his purchase. At the same time, Bob is also invited to apply for a credit card from the bank.

If Bob applies for and receives a credit card (with a bank account set up) from the bank, the bank may issue a bonus to Albert's account. If Bob uses the credit card anywhere, the bank may issue another bonus to Albert's account, since the bank now generates income from the credit card transaction. If Bob applies for a loan to purchase a house, a car or refinance, the bank may issue an even bigger bonus to Albert, since the bank now clearly makes more money from the loan. Albert may even get a bonus based on the average deposit in the bank by Bob. The more Bob saves in the Bank, the more bonus Albert receives, provided of course the system is designed to prevent Albert from figuring out what Bob is doing with his bank account. The system can be readily designed to protect the privacy of the customers.

In this example, neither Albert nor Bob is buying any merchandise from the bank. They are using the financial services offered at the bank. They can still purchase their goods anywhere, provided they use the bank-issued credit card, or use the financial services offered by the bank.

Comparison with Conventional Network

The following table represents a non-exhaustive comparison of some more significant features between a conventional network, typically a multi-level direct-marketing ("DM") company, and an exemplary network in accordance with the present invention ("BCN"). It should be noted that the comparison herein is not premised on the assumption that the BCN is in any way similar to the conventional DM. In fact, the BCN of the present invention has been demonstrated to be quite unique and beneficial, even when compared to DM.

1. The conventional network typically requires a prospective member to purchase designated products directly from the DM company, as well as start-up kit and training material. The BCN of the present invention only requires a prospective member to apply for a "credit card" and commence usage, say, with certain time frame. In the case where the "credit card" is the aforementioned "membership" to a membership merchant network, e.g. Costco, Sam's Club or a combination of merchants and service providers, the prospective member only has to apply to join the merchant network, and begin consumption within the network. While the merchant within the merchant network may see a decrease in their revenue, due to the credits given to the referring members, such decrease should be more than offset by the additional new revenue brought forth by the ever-increasing loyal membership.

2. The conventional DM requires members to go through a host of product and marketing training sessions, whereas the BCN does not.

3. The conventional DM requires members to actively promote its products and membership to their associates, as well as friends and family, much to the dismay of those who have to endure to the sales pitch of the members. The BCN only needs the members to distribute their business cards, or referral coupons, to others, in their normal course of business. No special training is required in the BCN.

4. The conventional DM's members derive their profits from the sale of those designated products. In the BCN, the members' profits are derived from the credit payments based on purchases made with the credit card, or purchases made within the membership merchants.

5. The designated products in the conventional DM are generally much more expensive than their counterparts in the typical market place. Due to their lack of name brand recognition, it become more difficult for the members to promote those designated products. The membership merchants in the BCN and the products they carry are already well recognized by the general public. The members in the BCN get more choices and at lower prices than the designated products in the DM.

6. The conventional DM requires its members to maintain certain level of purchase, or risk losing their benefits. The members in the BCN never have to buy any "designated products," to maintain their benefits. Their benefits are derived from consumption, not from purchases of specific goods.

7. The conventional DM requires its members to pay for their own business cards. In the BCN, the members get free business cards, if their recipients continue to apply for credit cards, conduct certain number of transactions or achieve certain level of spending.

8. The conventional DM usually has very complicated benefit structures, e.g. two legged, or multi-legged. The BCN, the structure is very straightforward and easy to understand.

9. The conventional DM requires its members to maintain inventory and provide service. The BCN has no such requirements, since the merchants are already doing such in their normal channel, and the merchants don't have to carry any designated products.

Although the invention is described herein with reference to the preferred embodiment, one skilled in the art will readily appreciate that other applications may be substituted for those set forth herein without departing from the scope of the present invention. Accordingly, the invention should only be limited by the claims included below.

I claim:

1. A method of using a communications network with a server and a database to promote commerce and provide benefits to a cardholder, a merchant and a card issuer, comprising:
    a first cardholder applying for a credit card from a card issuer;
    upon approval, said card issuer issuing a credit card to said first cardholder;
    said card issuer also providing a first set of business cards for said first cardholder's distribution and use, said business cards containing therein merchant information and first cardholder information;
    said card issuer transmitting information about said first cardholder and merchant information to an electronic database through a communications network;
    said database creating an account for said first cardholder, upon receiving said information from said card issuer;
    upon using said credit card in a commercial transaction by said first cardholder, said card issuer further providing a second set of business cards for said first cardholder's distribution and use, said business cards containing therein merchant information and first cardholder information;
    said card issuer also transmitting information about said first cardholder and merchant information to an electronic database through a communications network;
    upon presenting one of said business cards from said first cardholder at one of designated merchants, said business card causing a predetermined discount to be taken at one of said merchants;
    said merchant registering the use of said business card to said electronic database.

2. The method of claim 1, wherein said business cards are electronic business cards, which can be electronically transmitted.

3. The method of claim 1, wherein said credit card is a membership card which entitles said first cardholder predetermined privileges with a predetermined group of merchants affiliated with said card issuer.

4. The method of claim 1, wherein said merchant information and cardholder information are contained as barcode on said business cards.

5. The method of claim 1, wherein said merchant information and cardholder information are contained in a passive or active electronic chip on said business cards.

6. The method of claim 1, wherein said cardholder information is shown as an account number on said business cards.

7. The method of claim 1, wherein said business cards are referral cards containing information to link to said cardholder information stored at said database.

8. The method of claim 1, further comprising:
    said first cardholder distributing one of said business cards to a second person;
    said second person presenting said business card at one of said designated merchants for a commercial transaction;
    said merchant verifying said business card by communicating with said database and if verified, providing a predetermined discount to said second person;
    said merchant issuing a credit to said first cardholder based on said second person's commercial transaction with said merchant, by communicating with said database;
    upon notification by said merchant under predetermined criteria, said database notifying said card issuer regarding said second person's use of said business card from said first cardholder;
    upon notification by said database under predetermined criteria, said card issuer providing a third set of business cards to said first cardholder for distribution and use.

9. The method of claim 1, further comprising:
    said first cardholder distributing one of said business cards to a second person;
    said second person presenting said business card at one of said designated merchants for a commercial transaction;
    said merchant verifying said business card by communicating with said database and if verified, providing a predetermined discount to said second person;
    said merchant notifying said card issuer of said second person;
    upon notification by said merchant, said card issuer inviting said second person to apply for a credit card;
    said card issuer issuing a credit to said first cardholder when said second person qualifies for a credit card from said card issuer;
    said card issuer providing a third set of business cards to said first cardholder for distribution and use.

10. The method of claim 8, further comprising:
    said card issuer providing a first set of business cards to said second person for use and distribution under predetermined criteria;
    said second person applying for a credit card from said card issuer;
    if approved, said card issuer providing a credit card to said second person.

* * * * *